S. Miller,
Hay Fork.

No. 86,775.

Patented Feb. 9, 1869.

Witnesses
A. Bennixendorf
Wm. A. Morgan

Inventor
S. Miller per Munn & Co
Attorneys

SAMUEL MILLER, OF MOHAWK, NEW YORK.

Letters Patent No. 86,775, dated February 9, 1869.

IMPROVEMENT IN HORSE HAY-FORKS.

The Schedule referred to in these Letters Patent and making part of the same.

*To all whom it may concern:*

Be it known that I, SAMUEL MILLER, of Mohawk, in the county of Herkimer, and State of New York, have invented a new and improved Horse Hay-Fork; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved horse hay-fork, simple in construction, and effective in operation; and It consists in the construction and combination of the various parts, as hereinafter more fully described.

A is a short shaft, upon the upper end of which is formed an eye, or ring, $a'$, for the attachment of the hoisting-rope.

To the lower end of the shaft A is attached a triangular block, B, the lower end of which may be pointed, so that it may encounter less resistance when the fork is forced into the hay.

Figure 1:
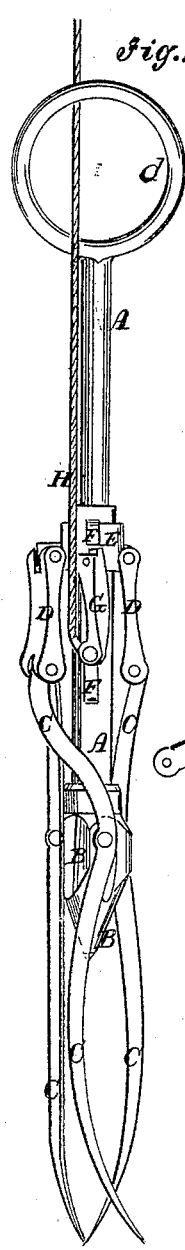
Figure 1 is a side view of my improved horse hay-fork.

To the faces of the triangular block B, are pivoted the tines C, the lower parts of which are curved, as shown in fig. 1.

The upper parts of the tines C are bent, or twisted, so as to bring their upper ends in a line with the shaft A.

To the upper ends of the tines C, are pivoted the lower ends of the connecting-rods, or bars, D, the upper ends of which are pivoted to the collar E, which slides up and down upon the shaft A, and which is kept from revolving upon the said shaft by the spring F, so that the points of the connecting-bars cannot bind in operating the fork. By this construction, the connecting-bars D operate the tines C in the manner of toggle-joints.

F is a spring, which is attached longitudinally to the side of the shaft A, at the central part of said spring.

Figure 2:
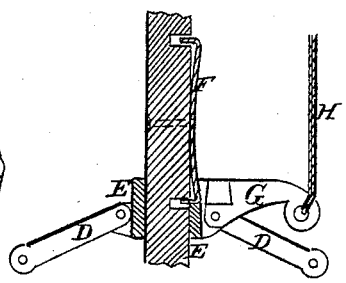
Figure 2 is a detail sectional view of the same.

The spring F is so arranged, with reference to the collar E and shaft A, that when the said collar is pushed down, so as to expand the tines C to their full extent, the lower end of the spring F may catch upon the said collar, as shown in fig. 2, and hold the fork locked.

As the collar E is drawn up, the upper part of the spring F presses against it, so as to prevent not only the tines C from being expanded by the collar E dropping down, from its own weight, but also to prevent the tines from expanding too easily and quickly, when the fork is being pushed into the hay.

G is the tripping-arm, the inner end of which is pivoted, or hinged, to the collar E, directly over the groove in said collar, which receives the spring F, so that when the said arm is raised into a horizontal position, a projection, formed upon the inner or pivoted end of the said arm, may press in the said spring F, allowing the tines C to be drawn together by the weight of the load as it slips from them.

H is the tripping-cord, one end of which is attached to the outer or free end of the arm G, and passes thence through the eye, or ring, $a'$, and down into such a position that it may be conveniently reached and operated to trip the fork when desired.

In using the fork, it is thrust, when in the position shown in fig. 1, down into the hay or grain to be unloaded, the resistance of the hay and the curvature of the tines causing the said tines to gradually expand. Should the tines fully expand, while pushing the fork down, the spring F will lock them expanded. Should they not fully expand, the expansion may be completed by pressing down with the foot upon the end of the pivoted arm G.

Having thus described my invention,

I claim as new, and desire to secure by Letters Patent—

The combination of the spring F and pivoted tripping-arm G with the slotted sliding collar E, pivoted arms D, curved arms C, and shaft A, operating as described, for the purpose specified.

SAMUEL MILLER.

Witnesses:
  A. D. MARSHALL,
  THOMAS CUNNINGHAM.